A. WISWALL, DEC'D.
E. W. SHEDD, ADMINISTRATOR.
RESILIENT VEHICLE WHEEL.
APPLICATION FILED MAY 22, 1919.

1,424,865.

Patented Aug. 8, 1922.
2 SHEETS—SHEET 1.

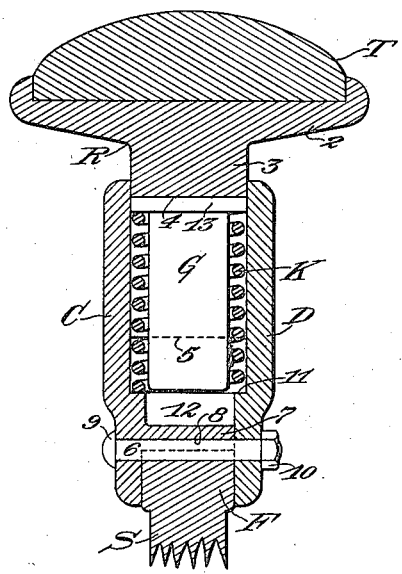

UNITED STATES PATENT OFFICE.

ALVAH WISWALL, OF PROVIDENCE, RHODE ISLAND; EDWARD W. SHEDD ADMINISTRATOR OF SAID ALVAH WISWALL, DECEASED.

RESILIENT VEHICLE WHEEL.

1,424,865.	Specification of Letters Patent.	Patented Aug. 8, 1922.

Application filed May 22, 1919. Serial No. 299,014.

*To all whom it may concern:*

Be it known that I, ALVAH WISWALL, a citizen of the United States, residing at Providence, in the county of Providence, State of Rhode Island, have invented certain new and useful Improvements in Resilient Vehicle Wheels, of which the following is a specification.

My invention relates to improvements in resilient wheels for automobiles and other vehicles. The object of my improvement is to provide a vehicle-wheel having an outer, floating, tire-carrying rim which is maintained in spaced relation to the main felly of the wheel by springs or equivalent resilient means to adapt it to yield as the tire encounters rough places or irregularities on the ground. A particular feature of the invention consists in the improved method of locking the outer tire-rim rotatively with the felly of the wheel, whereby it may be driven therefrom through the hub and spokes without restricting its free and easy yielding movement. The invention further contemplates improvements in the general structure and arrangement of the parts of the wheel to render it more efficient and durable in use.

The manner and means for carrying out these improvements are fully described in the following specification, illustrated by the accompanying drawings, in which like reference characters designate like parts. In the drawings—

Fig. 2 is an enlarged cross-sectional view of a portion of the wheel, showing the connections between the tire-rim and felly;

Fig. 3 is a perspective view of a section of one of the side-plates or flanges of the wheel;

Fig. 4 is a similar view of the opposite side-plate; and

Fig. 5 is an enlarged, cross-sectional, detail view showing a modified form of mounting for the tire-rim.

Figure 1:
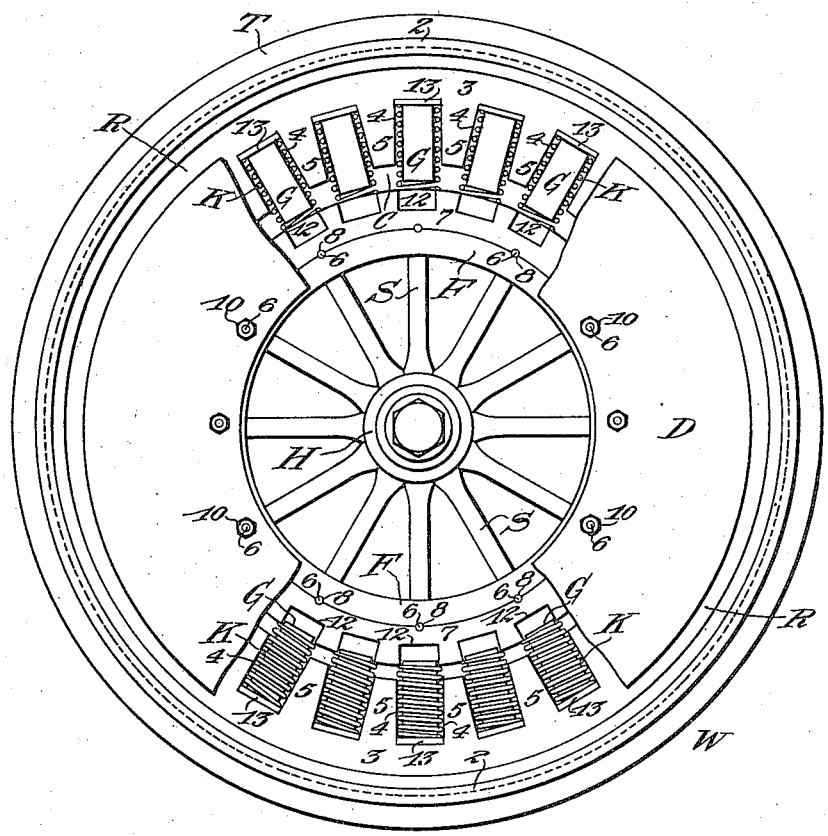
Fig. 1 is a side elevation of my improved vehicle-wheel, showing one of its side-plates broken away to illustrate the connecting-means between its felly and the outer tire-rim.

Referring first to Fig. 1, my improved wheel W as herein shown comprises, in general, a central hub H from which radiate spokes S carrying a rigid rim or felly F at their ends. These parts are generally constructed of wood in order to save weight, but they might be formed of metal if preferred. Arranged concentrically with the felly F of the wheel W is an outer rim R having a relatively broad annulus 2 at its periphery which is grooved to receive the solid-rubber tire or tread T, see Fig. 2. The inner portion of the rim R is constructed in the form of a relatively narrow ring 3 having a continuous series of radial slots or pockets 4 on its interior. The slots 4 are of rectangular outline leaving wedge-shaped teeth 5 projecting radially inward toward the axis of the wheel.

Fitted to the opposite sides of the felly F of the wheel W are two annular plates or rings C and D which are clamped thereon by means of cross bolts 6. One of the plates C is formed on its side with an annular flange 7, see Fig. 3, which fits snugly over the periphery of the felly F, with the other plate D abutting its side. The bolts 6 extend through holes 8 formed partly on the under side of the flange 7 and partly in the rim of the felly F, see Figs. 2 and 3. The bolts 6 are formed with heads 9 abutting the side of the plate C and are provided with nuts 10 on their opposite ends which are set up against the side of the plate D to clamp both plates against the felly F. The engagement of the bolts 6 with both the under side of the flange 7 and the periphery of the felly F serves to key both plates C and D rotatively to the main part of the wheel. It will be noted from Figs. 3 and 4 that the outer portions of the plates C and D are offset laterally from the inner portions which abut the sides of the felly F. This provides a wider space between the sides of the plates where they project beyond the rim of the felly F to adapt the annular web or ring 3 of the outer rim R to be received and guided between the plates. It will also be observed that the offset in the plate D forms a ledge or shoulder 11 which is flush with the periphery of the flange 7 on the plate C and cooperates therewith for a purpose as later described.

Referring to Fig. 3, the flange 7 on the plate C is formed with a series of equidistantly spaced pockets 12 adapted to receive the inner ends of a plurality of lock-pins or studs G which are arranged within the radial slots 4 of the outer tire-rim R, see Fig. 1. As shown more particularly in Fig. 2, the studs G are formed with heads 13 adapted to take the outward thrust of helical springs K which are coiled around the studs and arranged to bear at their inner ends against the periphery of the flange 7 on the plate C and on the ledge 11 of the plate D.

The complete wheel is assembled as follows: The plate C is first applied to position on one side of the felly F with its rim 7 fitted snugly around the periphery thereof. The outer tire-rim R is then set in place with its ring 3 against the inside of the plate C in concentric relation to the flange 7. The springs K are next applied to the studs G and the latter inserted in the radial slots 4 in the ring 3 of the rim R with their heads 13 engaging the sides thereof. During this operation the springs K are compressed to some extent so that as their ends bear against the outer periphery of the flange 7 they will force the outer ends of the studs G against the ends of the slots 4 in the rim R. Moreover, the tension of the springs K will tend to maintain the outer rim R of the wheel in concentric relation with the flange 7, with the inner ends of the studs G clear of the pockets 12 therein. To complete the wheel the side-flange or plate D is now placed against the other side of the felly F in opposite relation to the plate C with the bolts 6 inserted therethrough and their nuts 10 secured thereon. In this manner the two side-plates C and D are clamped against the sides of the felly F and secured rotatively therewith, with the ring 3 of the rim R arranged therebetween. The plates C and D thus serve to hold the rim R in place laterally of the felly F while allowing it to float radially to a certain extent in relation to the axis of the wheel; and the studs G and their springs K are held in the pockets 4 of the rim while being concealed from view and protected against dust and dirt.

Normally, with the wheel W free from load, its rim R will be maintained substantially concentric with the felly F under the tension of the springs K arranged therebetween, and the inner ends of the studs G will be clear of the pockets 12 in the flange 7. When the wheel is applied to use on the vehicle, however, the weight of the latter combined with its load will cause the main part of the wheel to settle in relation to its rim R, as the springs K are compressed. That is to say, the portion of the rim adjacent its point of contact with the ground will be carried into closer relation with the felly F, as the springs K yield under the load, and consequently the inner ends of the several studs G near the base of the wheel will be carried into engagement with the pockets 12 in the flange 7 on the felly F, see Fig. 1. This provides for locking the tire-rim R rotatively with the main part of the wheel W at its point of traction, so that the wheel may be employed as a driver to propel the vehicle over the ground under the power applied through its hub. At the same time, it is to be particularly noted that the greater proportion of the rim R is left free from the felly, without any interlocking engagement of the means extending therebetween. Through this improved arrangement of the parts of the device the outer rim R is allowed to play up and down or float freely in relation to the axis of the wheel as provided for by the yielding action of the springs K. Stated briefly, the movement of the rim R is not restricted or resisted at points horizontally opposite its hub, as would be the case if all of the driving-studs G remained in engagement with the pockets 12 on the periphery of its inner rim. It will be seen, therefore, that my improvement provides for a free floating action of the outer rim or tread of the wheel to allow it to yield under shocks or blows caused by irregularities and bumps in the ground or roadway; and thus it possesses a maximum degree of resiliency while also being adapted for use as a driver through the interlocking arrangement of its rim and felly at the point of traction. My invention thus provides a particularly practical and efficient resilient wheel which is sturdy of structure, yet sensitive of action, so that it is well adapted to replace the usual pneumatic-tired wheel which is open to serious disadvantage owing to the liability of puncture.

The embodiment of the invention above described is intended for use especially on trucks or heavy vehicles, the compression springs K being relatively stiff to adapt the wheel to support heavy loads. In Fig. 5, however, I have illustrated a modification in the structure of the wheel which adapts it for use on lighter vehicles, such as pleasure automobiles or carriages. For this purpose a series of lighter, auxiliary springs L are employed in addition to the main springs K. As shown in Fig. 5, the driving-studs G are made shorter and prevented from bottoming in their pockets 4 in the rim R by the light springs L. The springs L bear against the ends of the pockets 4 and the heads 13 of the studs G and will respond more quickly under light loads to allow the rim R to yield under road shocks. At the same time the heavier springs K serve to maintain the studs G normally free from the pockets 12 in the flange 7, except at the point of traction of the wheel with the ground where one or more of the studs is always engaged with the flange to provide the driving connection.

It is obvious that other modifications might be made in the structure and arrangement of the parts of the device without departing from the spirit or scope of the invention, therefore, without limiting myself to the exact embodiments herein shown and described, what I claim is:

1. In a resilient vehicle-wheel, the combination with a wheel-structure having a fixed rim, of an outer floating rim surrounding the fixed rim, both of said rims formed with opposite pockets closely spaced therearound, resilient means arranged between the two rims to maintain them normally in concentric relation, and a plurality of studs mounted in the pockets of one rim to adapt them to positively engage the pockets in the opposite rim, said studs being so arranged that only a portion of their number engage between the two rims at the traction point of the wheel when the outer rim is carried into eccentric relation with the inner fixed rim.

2. In a resilient vehicle-wheel, the combination with an inner wheel-structure having a fixed rim provided with pockets on its periphery, of an outer floating rim surrounding the fixed rim in spaced relation thereto, inwardly-projecting radial studs carried by the outer rim in register with the pockets of the fixed rim but normally clear therefrom, and helical springs surrounding the studs and bearing against the fixed rim to maintain the outer rim in concentric relation thereto while allowing it to yield to engage certain of its studs with certain of the pockets at the traction point of the wheel.

3. In a resilient vehicle-wheel, the combination with an inner wheel-structure having a fixed rim with opposite side-flanges extending outwardly beyond its periphery, of an outer floating tire-rim having an annulus held between the side-flanges of the fixed rim, resilient means for maintaining the outer rim normally in concentric relation with the fixed rim, and means for positively engaging the outer rim rotatively with the fixed rim at a plurality of points adjacent the traction point of the wheel when the outer rim is carried into eccentric relation thereto whereby to provide a driving connection between the two rims.

4. In a resilient vehicle-wheel, the combination with an inner wheel-structure having a fixed rim with a series of pockets spaced around its periphery, of an outer floating tire-rim surrounding the fixed rim in spaced relation thereto and formed with pockets on its interior, headed studs arranged in the pockets of the outer rim, and helical springs surrounding said studs and held under tension between their heads and the periphery of the fixed rim to normally prevent the studs from engaging with the pockets in the fixed rim when the outer rim is maintained in concentric relation therewith by the pressure of the springs.

5. In a resilient vehicle-wheel, the combination with an inner wheel-structure having a fixed rim, of an outer floating rim surrounding the fixed rim in spaced relation thereto, both of said rims formed with opposite alining pockets, studs slidable in said pockets, relatively heavy springs surrounding the studs and arranged to normally maintain them free from the pockets in the fixed rim, and auxiliary lighter springs arranged between the ends of the studs and the ends of the pockets of the outer rim.

6. In a resilient vehicle-wheel, the combination with a central hub supporting a fixed rim having pockets spaced around its periphery, of an outer floating rim surrounding the fixed rim and provided with pockets on its interior, annular flanges extending outwardly beyond the fixed rim and embracing the sides of the outer rim, headed studs slidably mounted in the pockets of the outer rim, coiled springs bearing between the heads of the studs and the periphery of the fixed rim, and auxiliary springs of less tension bearing between the ends of the studs and the bottom of the pockets in the outer rim.

In testimony whereof I affix my signature.

ALVAH WISWALL.